United States Patent
Brabec et al.

(10) Patent No.: US 10,885,469 B2
(45) Date of Patent: Jan. 5, 2021

(54) SCALABLE TRAINING OF RANDOM FORESTS FOR HIGH PRECISE MALWARE DETECTION

(71) Applicant: Cisco Technology, Inc., San Jose, CA (US)

(72) Inventors: Jan Brabec, Rakovnik (CZ); Lukas Machlica, Prague (CZ)

(73) Assignee: Cisco Technology, Inc., San Jose, CA (US)

(*) Notice: Subject to any disclaimer, the term of this patent is extended or adjusted under 35 U.S.C. 154(b) by 620 days.

(21) Appl. No.: 15/722,412

(22) Filed: Oct. 2, 2017

(65) Prior Publication Data

US 2019/0102337 A1  Apr. 4, 2019

(51) Int. Cl.
*G06N 20/00* (2019.01)
*G06F 21/56* (2013.01)
(Continued)

(52) U.S. Cl.
CPC ............ *G06N 20/00* (2019.01); *G06F 21/56* (2013.01); *G06F 21/562* (2013.01);
(Continued)

(58) Field of Classification Search
CPC ........ G06F 21/55; G06F 21/56; G06F 21/562; G06F 2221/2145; G06N 20/00;
(Continued)

(56) References Cited

U.S. PATENT DOCUMENTS

| 2008/0082468 A1* | 4/2008 | Long | G06K 9/6256 706/12 |
| 2015/0254566 A1 | 9/2015 | Chandramouli et al. | |

(Continued)

FOREIGN PATENT DOCUMENTS

CN  104794192 A  7/2015

OTHER PUBLICATIONS

Genuer et al., Random Forests for Big Data, pp. 1-52, Mar. 2017. (Year: 2017).*
Colthurst, et al., "TensorForest: Scalable Random Forests on TensorFlow", 30th Conference on Neural Information Processing Systems (NIPS 2016), https://docs.google.com/viewer?a=v&pid=sites&srcid=ZGVmYXVsdGRvbWFpbnxtbHN5c25pcHMyMDE2fGd4OjFlNTRiOWU2OGM2YzA4MjE, 2016, 7 pages, NIPS 2016.
Domingos, et al., "Mining high-speed data streams", KDD '00 Proceedings of the sixth ACM SIGKDD international conference on Knowledge discovery and data mining, 2000, 10 pages, ACM.

(Continued)

*Primary Examiner* — Vincent Gonzales
*Assistant Examiner* — Marshall L Werner
(74) *Attorney, Agent, or Firm* — Behmke Innovation Group LLC; Kenneth J. Heywood; Jonathon P. Western (57) ABSTRACT

In one embodiment, a device trains a machine learning-based malware classifier using a first randomly selected subset of samples from a training dataset. The classifier comprises a random decision forest. The device identifies, using at least a portion of the training dataset as input to the malware classifier, a set of misclassified samples from the training dataset that the malware classifier misclassifies. The device retrains the malware classifier using a second randomly selected subset of samples from the training dataset and the identified set of misclassified samples. The device adjusts prediction labels of individual leaves of the random decision forest of the retrained malware classifier based in part on decision changes in the forest that result from assessing the entire training dataset with the classifier. The device sends the malware classifier with the adjusted prediction labels for deployment into a network.

20 Claims, 7 Drawing Sheets

(51) Int. Cl.
*G06N 5/04* (2006.01)
*G06K 9/62* (2006.01)
*G06N 5/02* (2006.01)
*H04L 29/06* (2006.01)
*G06N 5/00* (2006.01)
*G06N 20/20* (2019.01)

(52) U.S. Cl.
CPC ......... *G06K 9/6256* (2013.01); *G06K 9/6267* (2013.01); *G06K 9/6282* (2013.01); *G06N 5/003* (2013.01); *G06N 5/025* (2013.01); *G06N 5/04* (2013.01); *G06N 20/20* (2019.01); *H04L 63/145* (2013.01); *G06F 2221/2145* (2013.01)

(58) Field of Classification Search
CPC ........ G06N 20/20; G06N 5/003; G06N 5/025; G06N 5/04; G06K 9/6256; G06K 9/6267; G06K 9/6282; H04L 63/145
See application file for complete search history.

(56) References Cited

U.S. PATENT DOCUMENTS

| | | |
|---|---|---|
| 2016/0048771 A1 | 2/2016 | Chen et al. |
| 2016/0078361 A1 | 3/2016 | Brueckner et al. |
| 2016/0371490 A1 | 12/2016 | Shakarian et al. |
| 2018/0260735 A1* | 9/2018 | Arad ................. G06N 20/00 |

OTHER PUBLICATIONS

Genuer, et al., "Random Forests for Big Data", Big Data Research, arXiv:1511.08327v2, 2017, 52 pages, arXiv.org.

Ren, et al., "Global Refinement of Random Forest", 2015 IEEE Conference on Computer Vision and Pattern Recognition (CVPR), 2015, 8 pages, IEEE.

* cited by examiner

SCALABLE TRAINING OF RANDOM FORESTS FOR HIGH PRECISE MALWARE DETECTION

TECHNICAL FIELD

The present disclosure relates generally to computer networks, and, more particularly, to scalable training of random forests for high precision malware detection.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic.

Beyond the various types of legitimate application traffic in a network, some network traffic may also be malicious. For example, some traffic may seek to overwhelm a service by sending a large number of requests to the service. Such attacks are also sometimes known as denial of service (DoS) attacks. Other forms of malicious traffic may seek to exfiltrate sensitive information from a network, such as credit card numbers, trade secrets, and the like. Typically, such traffic is generated by a client that has been infected with malware. Thus, further types of malicious network traffic include network traffic that propagate the malware itself and network traffic that passes control commands to already infected devices.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device trains a machine learning-based malware classifier using a first randomly selected subset of samples from a training dataset. The classifier comprises a random decision forest. The device identifies, using at least a portion of the training dataset as input to the malware classifier, a set of misclassified samples from the training dataset that the malware classifier misclassifies. The device retrains the malware classifier using a second randomly selected subset of samples from the training dataset and the identified set of misclassified samples. The device adjusts prediction labels of individual leaves of the random decision forest of the retrained malware classifier based in part on decision changes in the forest that result from assessing the entire training dataset with the classifier. The device sends the malware classifier with the adjusted prediction labels for deployment into a network.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
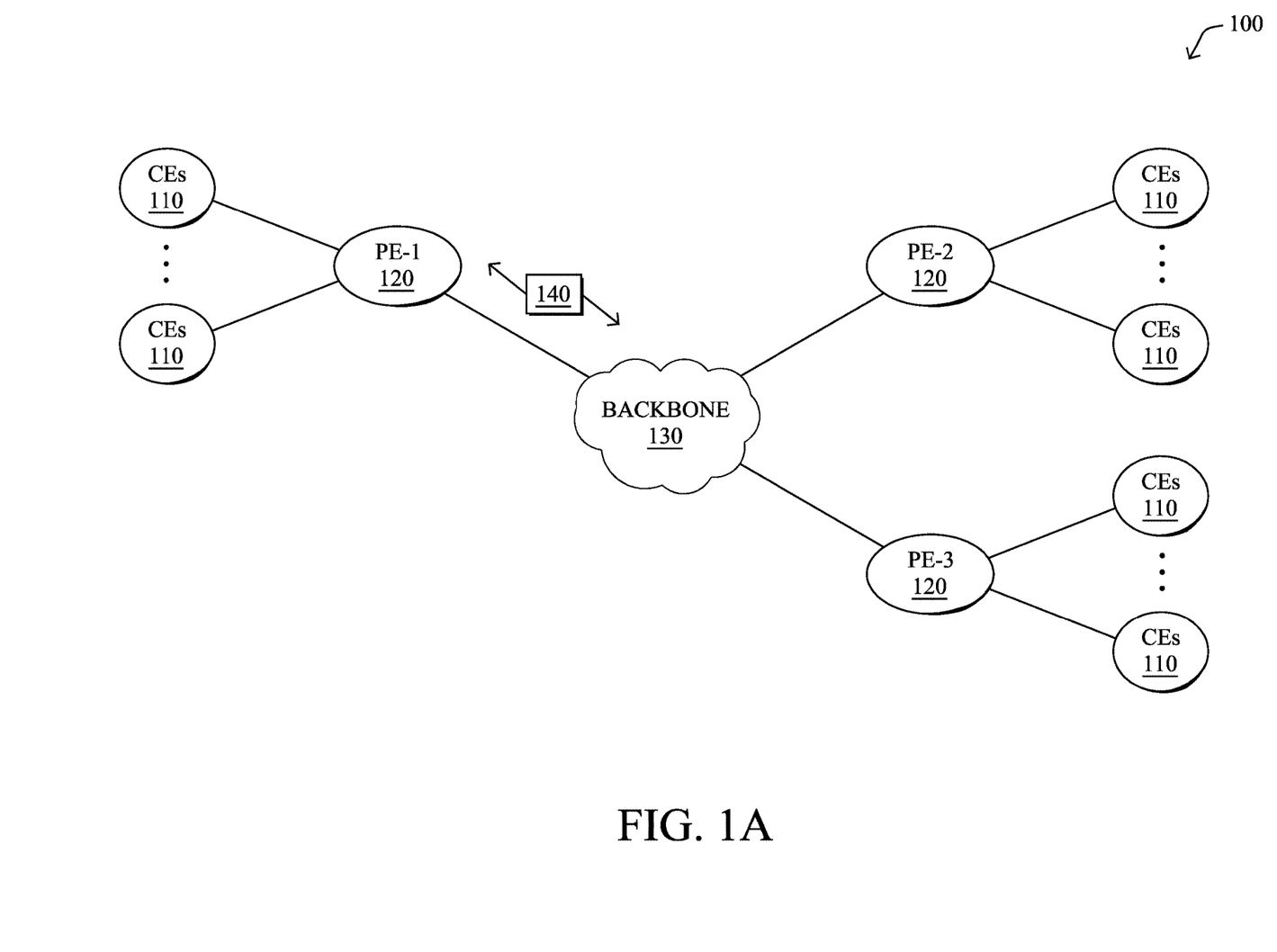
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
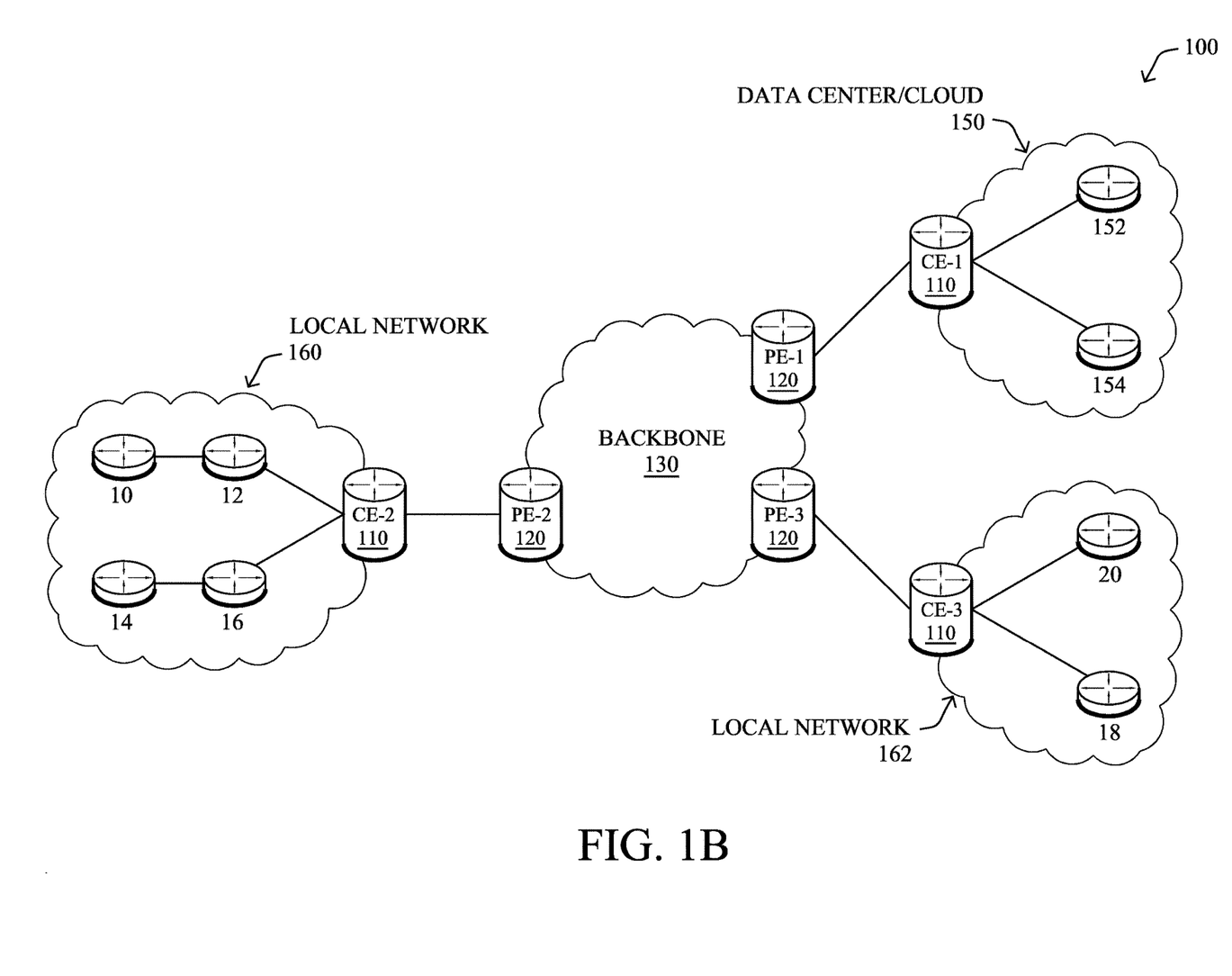

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
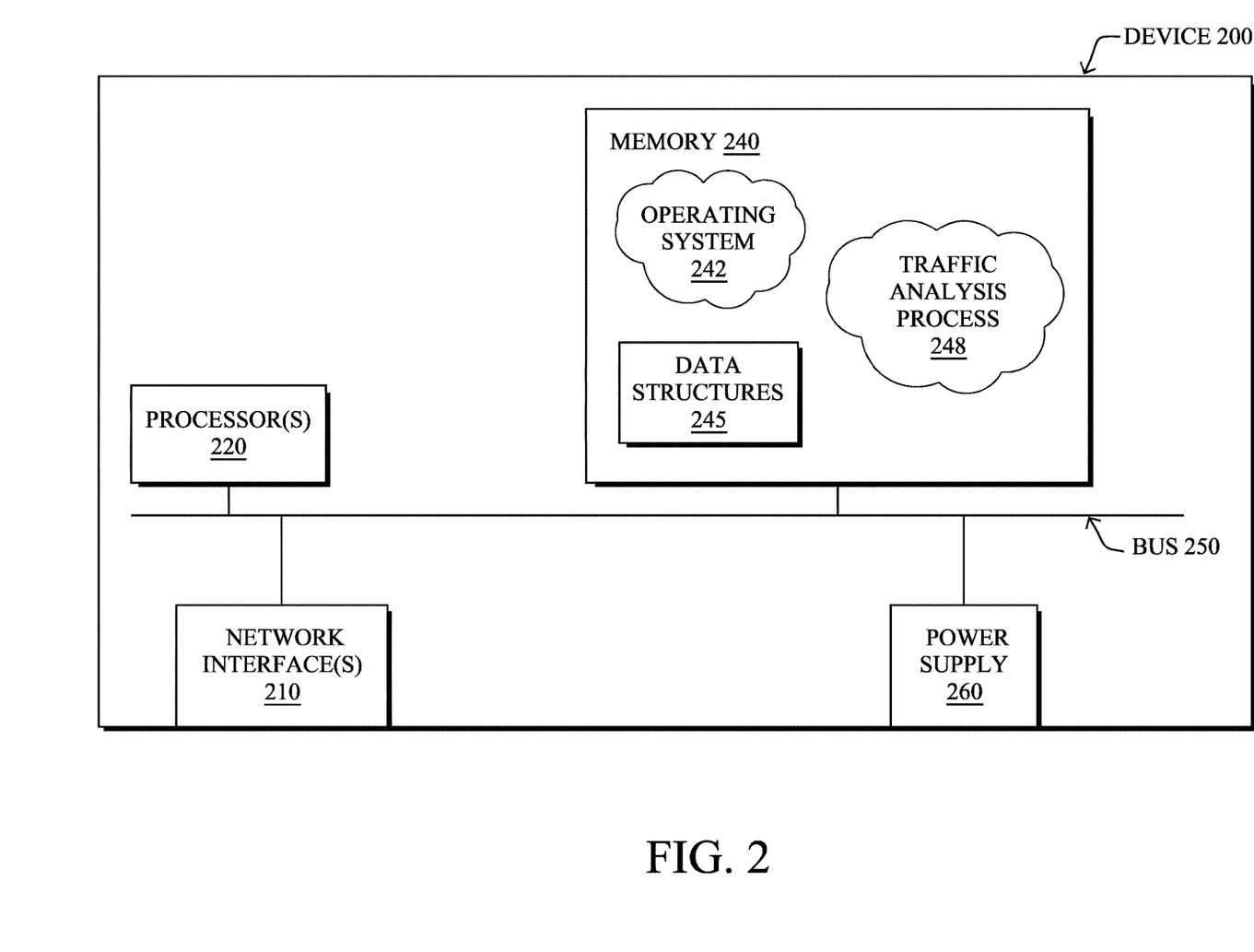
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other computing devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a traffic analysis process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, traffic analysis process 248 may execute one or more machine learning-based classifiers to classify traffic in the network for any number of purposes. In one embodiment, traffic analysis process 248 may assess captured telemetry data regarding one or more traffic flows, to determine whether a given traffic flow or set of flows are caused by malware in the network, such as a particular family of malware applications. Example forms of traffic that can be caused by malware may include, but are not limited to, traffic flows reporting exfiltrated data to a remote entity, spyware or ransomware-related flows, command and control (C2) traffic that oversees the operation of the deployed malware, traffic that is part of a network attack, such as a zero day attack or denial of service (DoS) attack, combinations thereof, or the like. In further embodiments, traffic analysis process 248 may classify the gathered telemetry data to detect other anomalous behaviors (e.g., malfunctioning devices, misconfigured devices, etc.), traffic pattern changes (e.g., a group of hosts begin sending significantly more or less traffic), or the like.

Traffic analysis process 248 may employ any number of machine learning techniques, to classify the gathered traffic data. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function is a function of the number of misclassified points. The learning process then operates by adjusting the parameters a,b,c such that the number of misclassified points is minimal. After this optimization/learning phase, traffic analysis 248 can use the model M to classify new data points, such as information regarding new traffic flows in the network. Often, M is a statistical model, and the cost function is inversely proportional to the likelihood of M, given the input data.

In various embodiments, traffic analysis process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is "normal," or "malware-generated." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that traffic analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random decision forest classification, or the like.

The performance of a machine learning model can be evaluated in a number of ways based on the number of true positives, false positives, true negatives, and/or false negatives of the model. For example, the false positives of the model may refer to the number of traffic flows that are incorrectly classified as malware-generated, anomalous, etc. Conversely, the false negatives of the model may refer to the number of traffic flows that the model incorrectly classifies as normal, when actually malware-generated, anomalous, etc. True negatives and positives may refer to the number of traffic flows that the model correctly classifies as normal or malware-generated, etc., respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

In some cases, traffic analysis process 248 may assess the captured telemetry data on a per-flow basis. In other embodiments, traffic analysis 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
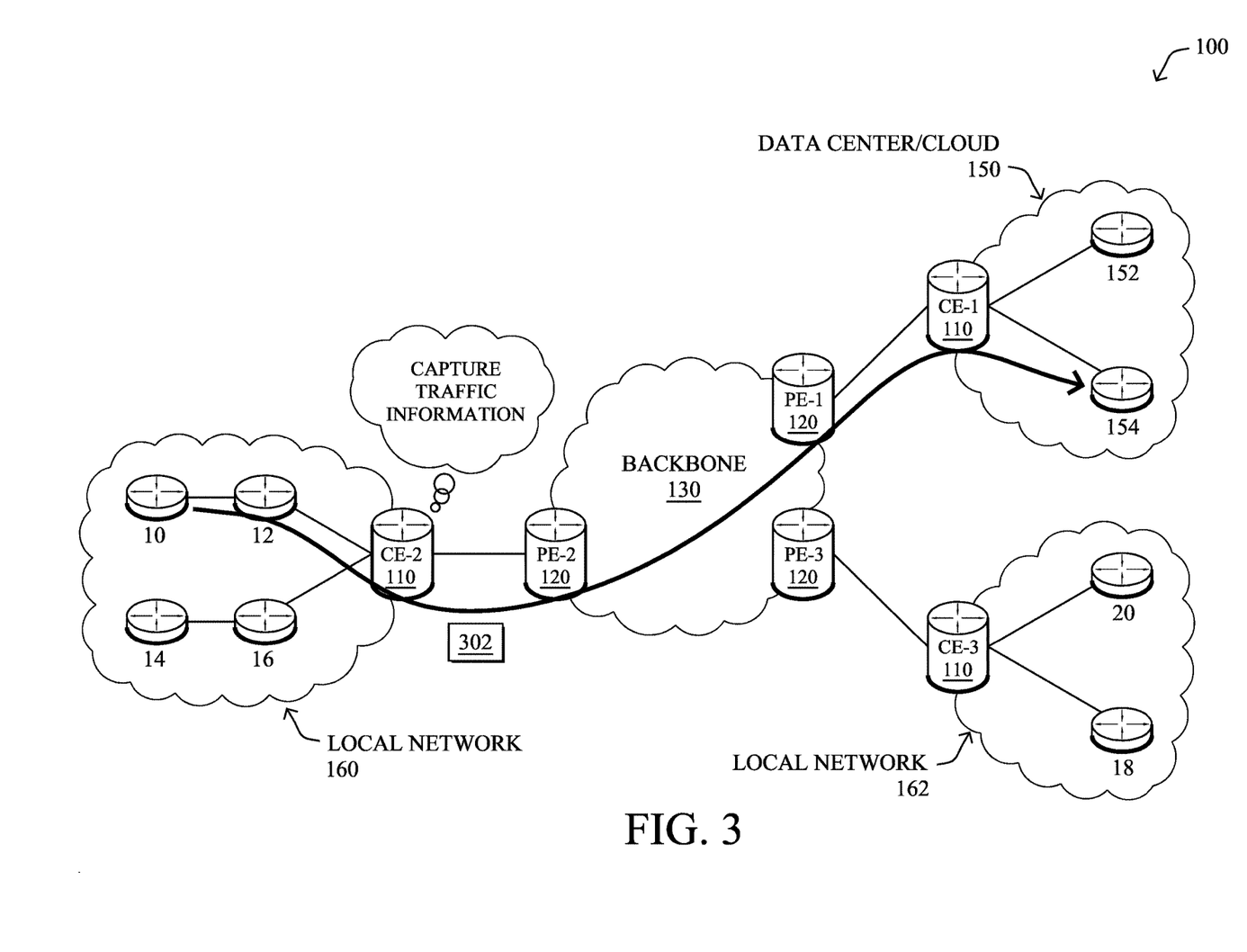
FIG. 3 illustrates an example of a device capturing traffic information.

As shown in FIG. 3, various mechanisms can be leveraged to capture information about traffic in a network, such as telemetry data regarding a traffic flow. For example, consider the case in which client node 10 initiates a traffic flow with remote server 154 that includes any number of packets 302. Any number of networking devices along the path of the flow may analyze and assess packet 302, to capture telemetry data regarding the traffic flow. For example, as shown, consider the case of edge router CE-2 through which the traffic between node 10 and server 154 flows.

In some embodiments, a networking device may analyze packet headers, to capture feature information about the traffic flow. For example, router CE-2 may capture the source address and/or port of host node 10, the destination address and/or port of server 154, the protocol(s) used by packet 302, or other header information by analyzing the header of a packet 302. Example captured features may include, but are not limited to, Transport Layer Security (TLS) information (e.g., from a TLS handshake), such as the ciphersuite offered, user agent, TLS extensions, etc., Hypertext Transfer Protocol (HTTP) information (e.g., URI, etc.), Domain Name System (DNS) information, or any other data features that can be extracted from the observed traffic flow(s).

In further embodiments, the device may also assess the payload of the packet to capture information about the traffic flow. For example, router CE-2 or another device may perform deep packet inspection (DPI) on one or more of packets 302, to assess the contents of the packet. Doing so may, for example, yield additional information that can be used to determine the application associated with the traffic flow (e.g., packets 302 were sent by a web browser of node 10, packets 302 were sent by a videoconferencing application, etc.).

The networking device that captures the flow telemetry data may also compute any number of statistics or metrics regarding the traffic flow. For example, CE-2 may determine the start time, end time, duration, packet size(s), the distribution of bytes within a flow, etc., associated with the traffic flow by observing packets 302. In further examples, the capturing device may capture sequence of packet lengths and time (SPLT) data regarding the traffic flow, sequence of application lengths and time (SALT) data regarding the traffic flow, or byte distribution (BD) data regarding the traffic flow.

As noted above, one potential machine learning-based approach to traffic classification (e.g., to detect malware, etc.) leverages the use of a random decision forest to assess an input feature vector of one or more characteristics of the network traffic. Generally, a random decision forest comprises a plurality of uncorrelated decision trees, also sometimes referred to as Bayesian trees, whereby nodes in a given tree represent decisions/conditions that are applied to the input feature(s). Thus, a path of a decision tree represents a set of applied decisions/conditions that, once applied, can be used to predict outcomes given the input feature(s).

Figure 4:
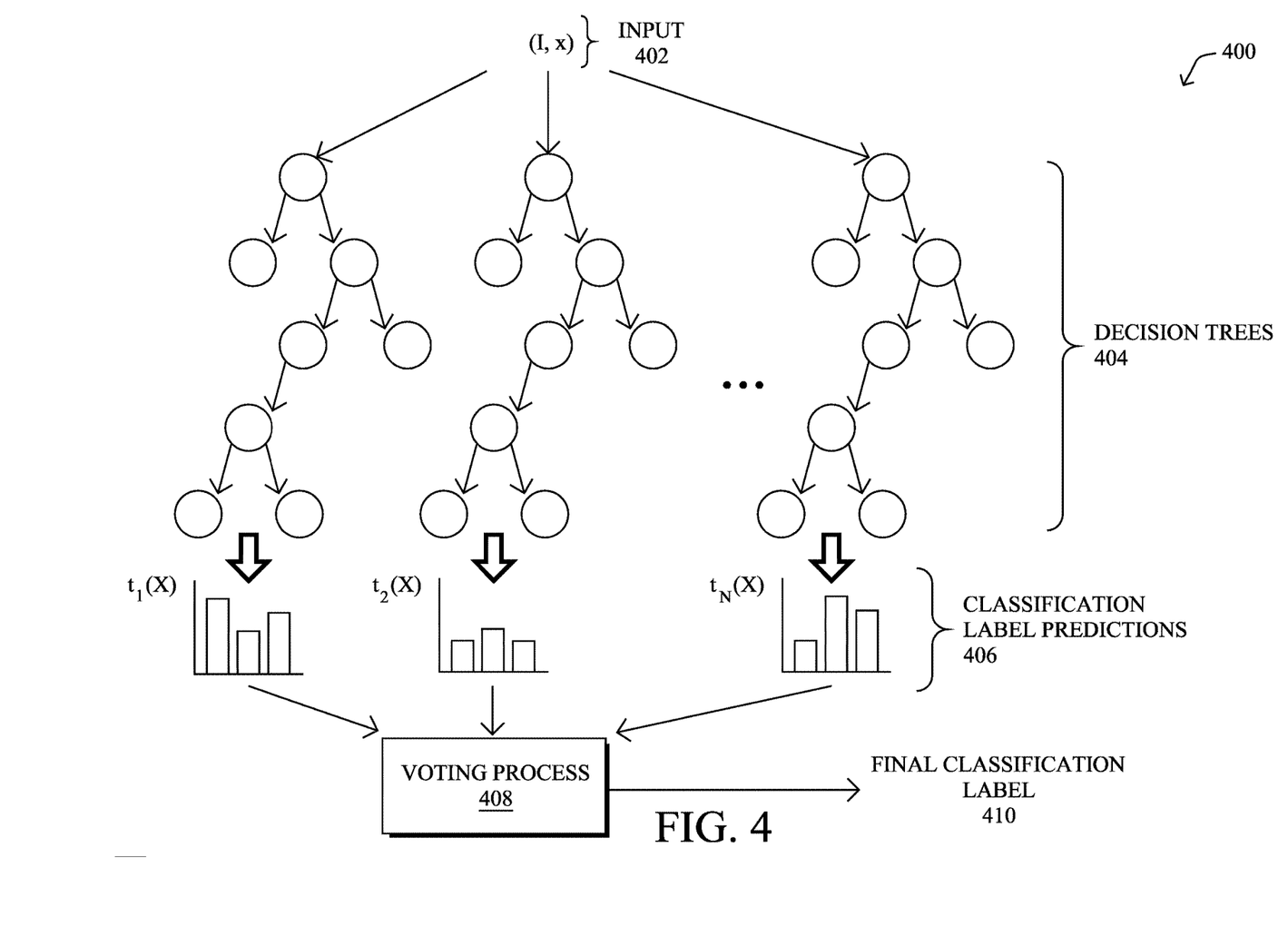
FIG. 4 illustrates an example random decision forest classifier.

FIG. 4 illustrates an example random decision forest classifier 400, according to various embodiments. In some embodiments, traffic analysis process 248 may use the random decision forest classifier 400 to determine a classification label for observed traffic in the network based on an input feature vector of the characteristics of the traffic. In a simplistic case, the classification labels may simply be "benign" or "malicious." However, more complicated, multi-class classifiers may also be used, e.g., to distinguish between different types of malware, etc.

As shown, random forest classifier 400 may comprise any number of decision trees 404 (e.g., a first through $n^{th}$ decision tree) each configured to generate classification label predictions 406 based on input 402. More specifically, as would be appreciated by one skilled in the art, nodes in decision trees 404 may correspond to different decisions/ conditions that can be applied to input 402. Probabilities can then be assigned, based on the results of these decisions/ conditions.

Training of decision trees 404 may be achieved using a technique referred to as 'bagging.' In particular, given a training dataset, each tree may be trained using a random subset of the training dataset that is sampled from the training dataset. Doing so increases the independence of the individual decision trees 404. The portion of the training dataset that is not used to train a given decision tree 404 is referred to as the 'out of bag (OOB)' dataset, which is typically different for each decision tree 400.

As each decision tree 404 generates its own classification label predictions 406 based on input 402, random decision forest 400 may also include a 'voting' process 408. During execution, voting process 408 may determine a final classification label 410 for input 402, based on the classification label predictions 406 from the individual decision trees 404.

More formally, the prediction 406 of the $i^{th}$ decision tree 404 in the forest of N-number of trees may be denoted as $t_i(x)$, where x is the data object to be classified from input 402. Further, let $Y=\{y_1, y_2, \ldots, y_K\}$ be the set of K-number of possible classification labels that forest 400 may apply, where $K=|Y|$. An additional notation that may be used to formally describe random decision forest 400 is I( ) which is an indicator function that may equal one if the condition is fulfilled (e.g., the prediction equals the true class label) and zero, otherwise.

In many cases, voting process 408 is configured to use majority voting among the classification label predictions 406 from decision trees 404. Using the notation above, this can be expressed as the formula:

$$\operatorname{argmax}_{y \in Y} \Sigma_{i=1}^{N} I(t_i(x)=y))  \qquad \text{(Equation 1)}$$

That is, input data feature vector x is classified with the classification label that received the most 'votes' from the ensemble of trees 404 (e.g., from classification label predictions 406). However, other voting approaches can be used, in further implementations, such as soft voting or the like.

As noted above, decision forests represent one promising way to construct a malware classifier. Although the training of decision forests is reasonably efficient, it is often not possible to use the full set of available training data to train a decision forest due to limitations in terms of computational resources. To give a real-world example, proxy logs can be used to train a malware classifier. However, the number of proxy logs available to the training entity can be in the billions, which is too large of a dataset for most computational systems. Accordingly, subsampling can be used on the full training dataset, to train the decision forest. For example, in the case of billions of available proxy logs, if only 1% are used to train the classifier, this still results in a training dataset size of tens of millions of logs.

Scalable Training of Random Forests for High Precision Malware Detection

The techniques herein allows all available training data in a large training dataset to be used to generate a random decision forest-based malware classifier, which could not be achieved otherwise due to a lack of computational resources. Thus, the techniques herein result in a high precision malware detector that is more capable in terms of detection performance with restricted resources. Preliminary testing of the techniques herein demonstrate a significant improvement over other training approaches, such as those that rely on subsampling.

Specifically, according to one or more embodiments of the disclosure as described in detail below, a device trains a machine learning-based malware classifier using a first randomly selected subset of samples from a training dataset. The classifier comprises a random decision forest. The device identifies, using at least a portion of the training dataset as input to the malware classifier, a set of misclassified samples from the training dataset that the malware classifier misclassifies. The device retrains the malware classifier using a second randomly selected subset of samples from the training dataset and the identified set of misclassified samples. The device adjusts prediction labels of individual leaves of the random decision forest of the retrained malware classifier based in part on decision changes in the forest that result from assessing the entire training dataset with the classifier. The device sends the malware classifier with the adjusted prediction labels for deployment into a network.

Illustratively, the techniques described herein may be performed by hardware, software, and/or firmware, such as in accordance with the traffic analysis process 248, which may include computer executable instructions executed by the processor 220 (or independent processor of interfaces 210) to perform functions relating to the techniques described herein.

Operationally, the techniques herein address the situation in which there is more training data available to train a random decision forest than can be feasibly used for training. One potential approach to this situation would be to randomly select a subset of the training dataset and only use this subset for training. The remaining portion of the full training dataset, which is typically orders of magnitude larger than the subset, can then be ignored. In the specific case of malware detection, the benign and malicious sample sets are highly imbalanced in favor of the benign set. The subsampling is, therefore, usually performed only in relation to the benign samples in the training dataset.

To construct a classifier with high precision, strong decision boundaries are needed between the malicious and benign classes. Thus, not only are malicious samples important during training, but so are benign samples that are close to the decision boundary. However, when subsampling is used on the training dataset, the probability sampling a benign sample close to the boundary is low. Consequently, a non-informative, negative (benign) training set may lead to significant drops in performance of the resulting classifier.

In various embodiments, the techniques herein leverage all available training data, which would be otherwise ignored, to improve the performance of the machine learning model. This approach can generally be divided into the following three stages:
 1. Stochastic iterative retraining
 2. Decision refinement
 3. Model complexity pruning For purposes of illustration, the following notation is used herein. First, let D represent the whole training dataset that is available. Let us define following notations used in the rest of this text. A randomly sampled subset of training dataset D is denoted as $S_f$, where f represents the fraction of data from D that is in $S_f$. For example, the dataset $S_{0.2}$ includes 20% of the samples randomly sampled from D.

The stochastic iterative retraining phase of the proposed techniques herein aims to identify important objects (e.g., samples/points close to the decision boundary between classes) in D, which are then used for the training the classifier instead of the random (uninformed) subset of objects. Inputs to the training process may comprise the fraction f, as well as a stopping criterion for the iterative retraining.

In first iteration, the device may randomly select a subset $S_f$ from the available training dataset D and use this subset to train the machine learning-based model. Random selection ensures that most of the available training data will be seen in different iterations during the complete model estimation process.

After initially training the model (e.g., a random decision forest), the device may use the model to classify all of the objects in D, instead of just the sampled objects, according to various embodiments. Then, in one embodiment, the device may identify any benign objects that were misclassified by the trained model and add these objects to a set of important objects, $D_{important}$.

In each further iteration of the retraining phase, the device may extend the current, randomly selected subset $S_f$ by the important objects $D_{important}$ that were identified in previous iterations, and using the combined set to retrain the model. The rationale behind this approach is that the misclassified objects from D are exactly the ones closest to the decision boundary. Said differently, the closer an object/sample from D gets to the decision boundary between malicious and benign, the higher the chances of the model misclassifying the object.

Various stopping criteria are possible, to determine when to stop the stochastic iterative retraining of the model. In one embodiment, a stopping criterion may be that no more objects were added to the set of important objects, $D_{important}$, during the current iteration. In another embodiment, the stopping criterion may be that no improvement was seen in the efficacy of the model on the test set. In a further embodiment, the stopping criterion may be a predefined, maximum number of iterations, so that all of the data in the training dataset has the chance to be selected. For example, if 20% of D is chosen as the training subset during any iteration (e.g., f=0.2), the maximum number of iterations may be chosen as 5. As would be appreciated, stopping criteria can also be combined, in some embodiments (e.g., stopping early when no more important objects are identified, with a maximum number iterations specified, etc.).

Pseudocode for the stochastic iterative retraining is as follows, using a set number of iterations, in various embodiments:

```
input:
    D; // the full training dataset
    P; // hyperparameters to the classifier training process (e.g.,
    process 248)
    f; // fraction of sampled training data
    N; // number of iterations
output: trained model M
D_important ← ∅;
for i ∈ {1,...,N} do
    S_f ← randomly sampled fraction f of data from D;
    D_i ← S_f ∪ D_important;
    M ← train model on D_i with hyperparameters P;
    D_errors ← find mispredictions of M on D;
    D_important ← D_errors ∪ D_important;
end
return M
```

It is expected that the size of the set of important objects $D_{important}$ is much smaller when compared to the size of dataset D. Therefore, it is still possible to train a model on the union of them. This is often the case in many real-world systems where the training dataset is highly imbalanced between malicious and benign samples on the order of 1:1,000 and more. In this case, the total number of misclassified objects is very small. For example, even a trivial classifier which always predicts the majority class is able to achieve a classification error of 1%, when the prevalence of majority class is 99%.

Note that in each iteration of the stochastic iterative retraining, the model is also trained on a different random subset $S_f$. In theory, this may cause some of the objects, which were correctly classified in the previous iteration by chance, to be misclassified in the current iteration and added to $D_{important}$ set. However, preliminary testing has found that the size of $D_{important}$ stabilizes after approximately five iterations of the retraining process. Note that while this approach is particularly suited for random decision forests, the iterative model retraining approach above is not limited as such and can be used to train other machine learning models, as well.

In various embodiments, after performing the stochastic iterative retraining detailed above, the device may perform decision refinement on the resulting model. In general, a decision tree can be viewed as a lattice that overlays the feature space, e.g., as a smart partition of the feature space. The goal, then, of the decision refinement is to label individual boxes/squares in the lattice according to the distribution of all the available data distributed across the lattice.

Input to the decision refinement phase may be the trained decision forest model M that results from the stochastic iterative model retraining. In turn, the decision refinement may use the whole dataset D to improve the prediction labels of individual leaves in the model. In some embodiments, the device may achieve this by classifying all of the objects in D using M and relabeling the leaves of the trees. More precisely, for each leaf in each tree, the device may compute the histogram of objects from D which is end up in this leaf. The device may then determine the final prediction of the leaf from the histogram (e.g., via soft voting) of class distributions in each leaf or, alternatively, the predicted class is the one with the highest object count, in various embodiments.

As would be appreciated, decision refinement is very cheap from a computational perspective, because it can be computed in a single pass over all of the data. It does not even require all data to be loaded into memory at once. Therefore, it can be easily computed even for very large datasets with very small memory requirements. In general, the model does not have to be trained with stochastic iterative retraining, in further embodiments. For example, if even the iterative model retraining is too expensive, the device may apply decision refinement to a model trained in a standard way, such as on the subsampled training dataset only.

According to various embodiments, the device may optionally also perform a model complexity pruning operation on the model that results from the decision refinement phase. Notably, it has been found that the decision refinement approach above may cause some of the leaves in the tree to be redundant. Thus, in some embodiments, these leaves can be removed without any loss, in order to reduce the complexity of the model (e.g., the number of nodes/vertices in the model).

Figure 5:
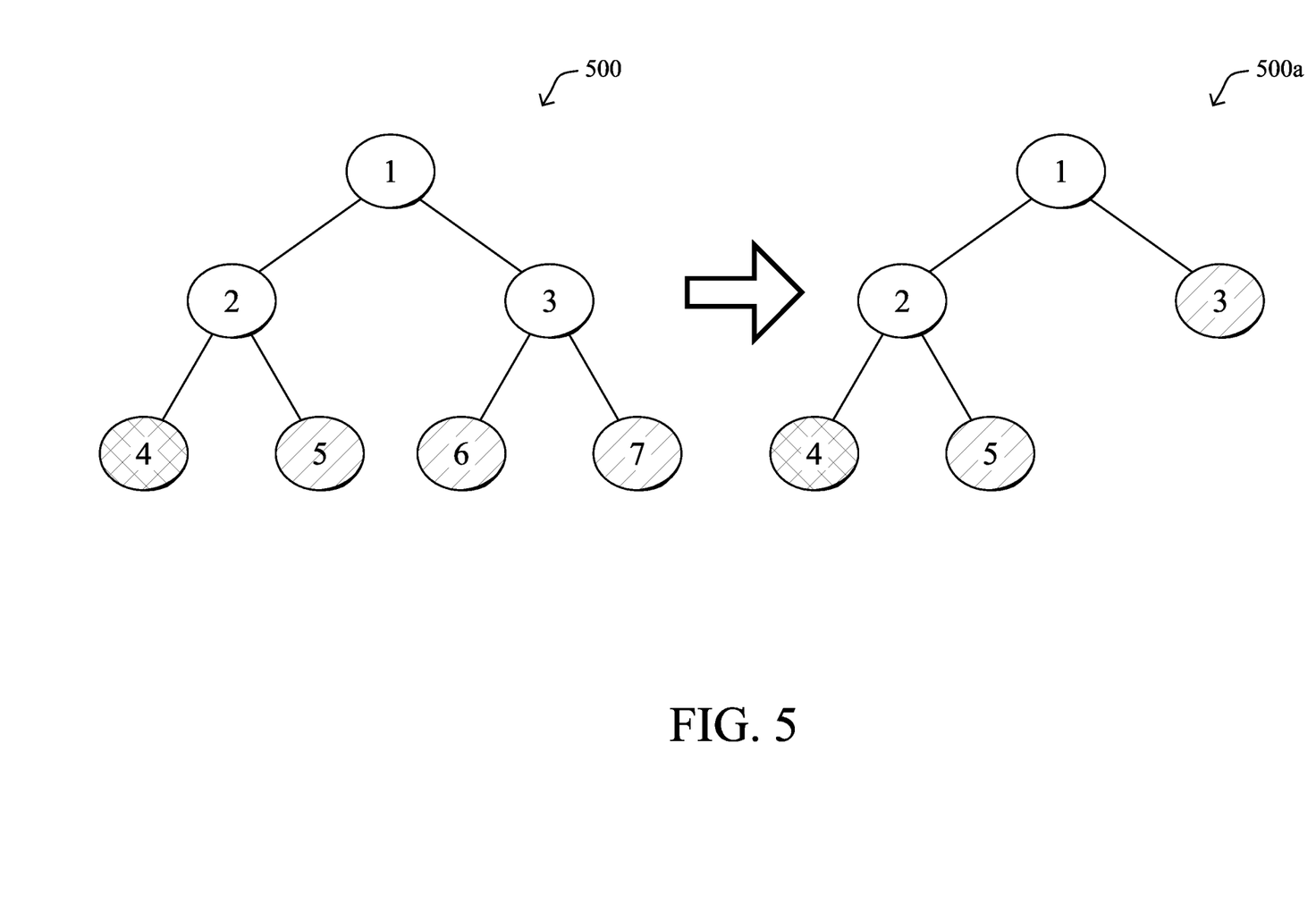
FIG. 5 illustrates an example of pruning leaves from a random decision forest.

FIG. 5 illustrates an example of pruning leaves from a random decision forest, in some embodiments. As shown, assume that a given decision tree 500 includes nodes 1-7 shown, which may be the result of the decision refinement phase described above. To determine whether there are redundancies, the device may test the children nodes of a given parent, to see whether they give the same class predictions. For example, as shown, nodes 4-5 are children of parent node 2 and output different predictions, meaning that they are not redundant. Conversely, nodes 6-7 shown are children of parent node 3 and both give equivalent predictions, meaning that they are redundant and can be removed.

In some embodiments, the device may perform pruning in a bottom-up manner, meaning that if a subtree is reduced to a single leaf, then the new leaf is again considered for pruning. For example, as shown, decision tree 500 may be pruned to be decision tree 500a by consolidating nodes 6-7 into their parent node 3. In turn, parent node 3 may itself be considered for consolidation (e.g., by comparing its prediction with its sibling node 2).

Example pseudocode for the pruning operation is as follows, in one embodiment:

```
input:
    t; \\ root node of an unpruned decision tree
output: root node of corresponding pruned decision tree
Function pruneTree(t)
    if isLeaf(t) then
        return t;
    else
    l ← pruneTree(leftChild(t));
    r ← pruneTree(rightChild(t));
    if isLeaf(l) ∧ isLeaf(r) ∧ (prediction(l) == prediction(r)) then
        return new leaf with prediction same as l and r;
    else
        return new split node equivalent to t, but with children l and r;
    end
end
```

Stated simply, pruning reduces the size of the tree, but does not affect the predictions of the tree. In doing so, the resources needed to store and execute the classifier may be reduced significantly, without any loss of performance.

The techniques herein were prototyped and tested using a training dataset based on proxy logs comprising approximately 600 million objects of which approximately 5 million were related to malware. For testing, 115 different malware classes were used, which were highly imbalanced in comparison to the benign samples (e.g., up to 1:100,000 in some cases). The test was also focused on classifying encrypted traffic, where only domain information and up/down bytes are available. Therefore, the extracted features from the proxy logs related to up/down bytes, certificate age, overall number of users visiting the domain in a particular time window, number of users visiting the autonomous system, domain registration date, etc. Detection was also performed on the proxy log level, i.e., each proxy log was mapped to a feature vector and classified.

The most telling metric from the test was the number of malware classes that have precision higher than a defined threshold. More specifically, during testing, the threshold was set to be 90% precision, since this is a good working point for a useable intrusion detection system (IDS). This metric is important because it measures how many classes the trained model is able to detect reliably without having too many false positives. In addition, the total number of detections in those classes were measured. Note that the evaluation is computed on the level of users/client devices, where a user/client device is infected by a specific malware if at least one of its flows is classified as being part of this malware communication.

In all the conducted experiments, a random decision forest was trained that comprised 100 trees with a maximum depth of 30 using the information gain splitting criterion. Results of the experiments are provided below in Table 1:

TABLE 1

| Method | Number of classes with precision over 90% | Total number of detections in classes with precision over 90% |
|---|---|---|
| baseline | 20 | 1789 |
| iterative | 23 | 2520 |
| iterative + relabeled | 44 | 4620 |

The baseline method corresponds to a random forest model trained on all of the positive/malware objects (2 million), but due to resource constraints only 1% negatives/benign objects (6 millions) were randomly sampled. The iterative method corresponds to a random forest model obtained by stochastic iterative retraining where the training dataset contained all of the positive objects, but negative objects were again subsampled to 1% of (parameter f=0.01) in each iteration. Overall, 5 iterations were performed. Interestingly, the set $D_{important}$ end up with 200,000 objects, that is the initial size increase by 3%. The iterative+ relabeled method has the decision refinement applied once the model was iteratively trained. Note that the whole training dataset (~3 billions objects) was used for the leaf refinement.

From Table 1 above, it can be seen that most of the malware classes out of the 115 are hard to detect when assuming high precision. Still, the total number of detected true positives in classes with precision over 90% is significantly higher for the iterative+ relabeled than for the iterative method, while baseline performs worst. The unpruned iterative+ relabeled model contains 9,000,990 nodes which requires 972 MB when serialized as a Apache Spark MLLib model. After the pruning step, the model contains only 2,083,738 nodes and requires 233 MB. That is, the pruning was able to remove more than 75% of the nodes without any loss in the performance of the classifier.

Figure 6:
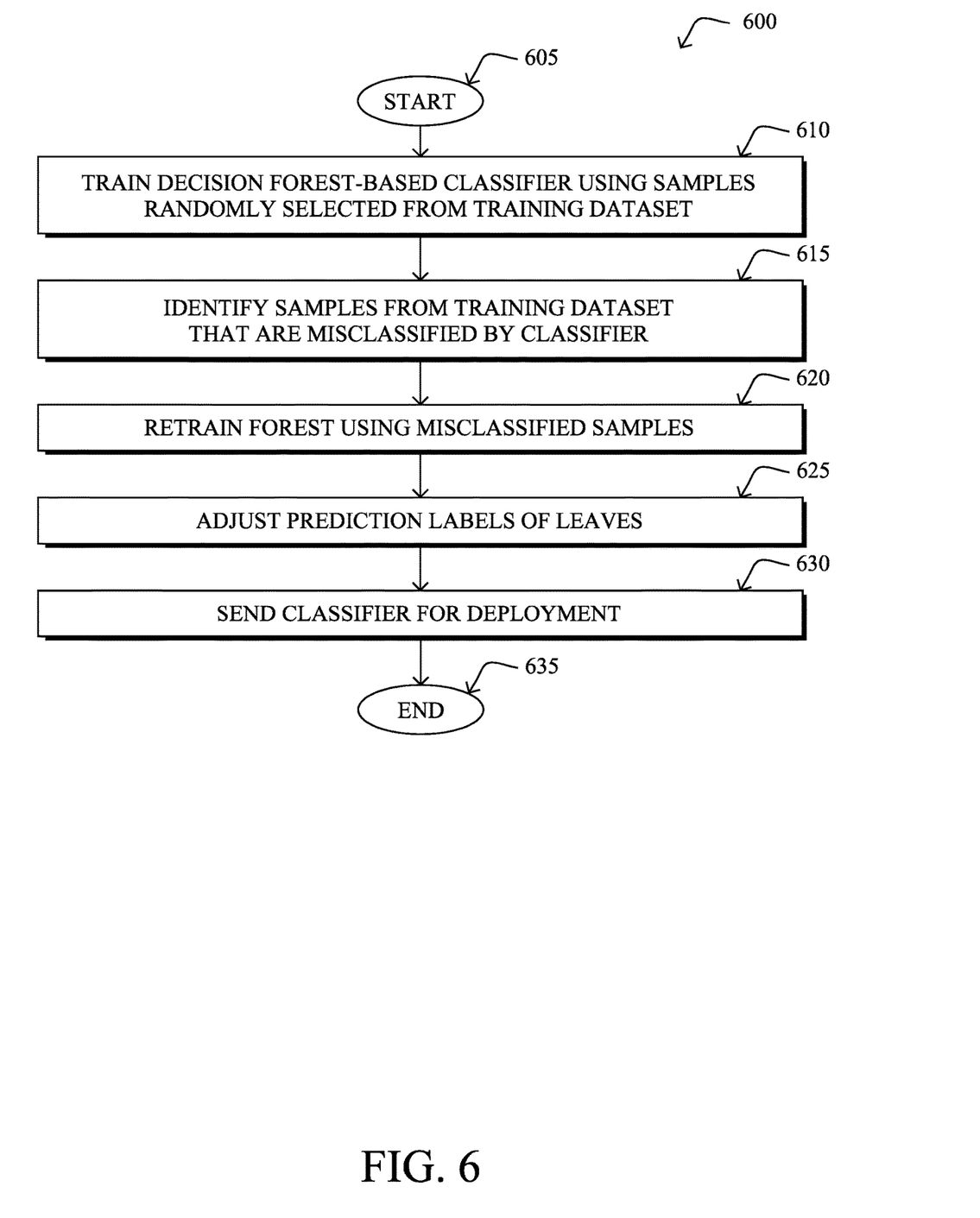
FIG. 6 illustrates an example simplified procedure for training a malware classifier.

FIG. 6 illustrates an example simplified procedure for training a malware classifier, in accordance with one or more embodiments described herein. For example, a non-generic, specifically configured device (e.g., device 200) may perform procedure 600 by executing stored instructions (e.g., process 248). The procedure 600 may start at step 605, and continues to step 610, where, as described in greater detail above, the device may train a machine learning-based malware classifier using a first randomly selected subset of samples from a training dataset. In various embodiments, the classifier may comprise a random decision forest. For example, the device may select a fraction of the full training dataset to perform the training.

At step 615, as detailed above, the device may identify, using at least a portion of the training dataset as input to the malware classifier, a set of misclassified samples from the training dataset that the malware classifier misclassifies. Notably, after training the machine learning-based model of the classifier using only a sampling of the training dataset, the device may test the model against the training dataset, to evaluate the efficacy of the model. As assumed herein, any misclassified samples that result may be viewed as being close to the decision boundary of the classifier. In turn, the device may form a set of the identified samples that were misclassified.

At step 620, the device may retrain the malware classifier using a second randomly selected subset of samples from the training dataset and the identified set of misclassified samples, as described in greater detail above. In particular, in various embodiments, the device may add the identified samples from step 615 to the second randomly selected subset of samples from the training dataset. By doing so, the samples assumed to be close to the decision threshold may be included in the retraining of the model.

At step 625, as detailed above, the device may adjust the prediction labels of individual leaves of the random decision forest of the retrained malware classifier, based in part on decision changes in the forest that result from assessing the entire training dataset with the classifier. More specifically, for each leaf in each tree, the device may compute the histogram of objects from the training dataset which end up in this leaf. The device may then determine the final prediction of the leaf from the histogram (e.g., via soft voting) of class distributions in each leaf or, alternatively, the predicted class is the one with the highest object count, in various embodiments.

At step 630, the device may send the malware classifier with the adjusted prediction labels for deployment into a network, as described in greater detail above. For example, if the device is part of a security service, it may send the resulting classifier to one or more local networks, to assess the traffic of the network(s). Notably, the trained classifier may be able to determine whether a given traffic flow of set of flows is indicative of malware and, in turn, raise an alert or initiate another mitigation action (e.g., by blocking a flow, etc.). Procedure 600 then ends at step 635.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for a very large number of objects (e.g., billions or more) to be used in the training phase of a malware classifier, to strengthen the decision boundaries of the classifier and increase its detection precision. In addition, the techniques herein also allow for the complexity of the classifier to be significantly reduced without any performance loss. Further, the techniques herein are well suited for the situation of imbalanced training data.

While there have been shown and described illustrative embodiments that provide for the scalable training of random decision forests for high precision malware detection, it is to be understood that various other adaptations and modifications may be made within the spirit and scope of the embodiments herein. For example, while certain embodiments are described herein with respect to using certain models, such as random decision forests, other models may be trained using the techniques herein, in other embodiments. In addition, while the techniques herein are described with respect to training malware classifiers, the techniques can also be used to train other types of classifiers such as image analysis classifiers, diagnosing medical conditions, or the like.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   training, by a device, a machine learning-based malware classifier using a first randomly selected subset of samples from a training dataset, wherein the classifier comprises a random decision forest;
   identifying, by the device and using at least a portion of the training dataset as input to the malware classifier, a set of misclassified samples from the training dataset that the malware classifier misclassifies;
   retraining, by the device, the malware classifier using a second randomly selected subset of samples from the training dataset combined with the entire set of the identified set of misclassified samples;
   adjusting, by the device, prediction labels of individual leaves of the random decision forest of the retrained malware classifier based in part on decision changes in the forest that result from assessing the entire training dataset with the classifier; and
   sending, by the device, the malware classifier with the adjusted prediction labels for deployment into a network.

2. The method as in claim 1, further comprising:
   iteratively, by the device and before adjusting the prediction labels, repeating the identifying and retraining steps using different randomly selected subsets of samples from the training dataset until a stopping criterion is met.

3. The method as in claim 2, wherein the stopping criterion comprises at least one of: a predefined number of iterations or no additional misclassified samples are identified in an iteration.

4. The method as in claim 3, wherein the predefined number of iterations is five or fewer.

5. The method as in claim 1, further comprising:
   pruning, by the device and after adjusting the prediction labels of the individual leaves of the random decision forest, leaves from the random decision forest.

6. The method as in claim 5, wherein pruning the leaves from the random decision forest comprises:
   merging child nodes of a parent node in the random decision forest into the parent node, when the child nodes give equivalent malware predictions.

7. The method as in claim 1, wherein adjusting the prediction labels of individual leaves of the random decision forest comprises:
   computing, by the device, a histogram of objects from the training dataset that are assessed by a particular leaf of the random decision forest; and
   using, by the device, the histogram to determine a final prediction label for the particular leaf.

8. The method as in claim 7, wherein using the histogram to determine the final prediction label for the leaf comprises:
   performing, by the device, soft voting of class labels in the particular leaf.

9. The method as in claim 7, wherein using the histogram to determine the final prediction label for the leaf comprises:
   identifying, by the device, the final prediction label as a predicted class having the highest object count.

10. An apparatus comprising:
    one or more network interfaces to communicate with a network;
    a processor coupled to the network interfaces and configured to execute one or more processes; and
    a memory configured to store a process executable by the processor, the process when executed configured to:
    train a machine learning-based malware classifier using a first randomly selected subset of samples from a training dataset, wherein the classifier comprises a random decision forest;
    identify, using at least a portion of the training dataset as input to the malware classifier, a set of misclassified samples from the training dataset that the malware classifier misclassifies;
    retrain the malware classifier using a second randomly selected subset of samples from the training dataset combined with the entire set of the identified set of misclassified samples;
    adjust prediction labels of individual leaves of the random decision forest of the retrained malware classifier based in part on decision changes in the forest that result from assessing the entire training dataset with the classifier; and
    send the malware classifier with the adjusted prediction labels for deployment into a network.

11. The apparatus as in claim 10, wherein the process when executed is further configured to:
    iteratively, and before adjusting the prediction labels, repeating the identifying and retraining steps using different randomly selected subsets of samples from the training dataset until a stopping criterion is met.

12. The apparatus as in claim 11, wherein the stopping criterion comprises at least one of: a predefined number of iterations or no additional misclassified samples are identified in an iteration.

13. The apparatus as in claim 12, wherein the predefined number of iterations is five or fewer.

14. The apparatus as in claim 10, wherein the process when executed is further configured to:
    prune, after adjusting the prediction labels of the individual leaves of the random decision forest, leaves from the random decision forest.

15. The apparatus as in claim 14, wherein pruning the leaves from the random decision forest comprises:
    merging child nodes of a parent node in the random decision forest into the parent node, when the child nodes give equivalent malware predictions.

16. The apparatus as in claim 10, wherein the apparatus adjusts the prediction labels of individual leaves of the random decision forest by:
    computing a histogram of objects from the training dataset that are assessed by a particular leaf of the random decision forest; and
    using the histogram to determine a final prediction label for the particular leaf.

17. The apparatus as in claim 16, wherein the apparatus uses the histogram to determine the final prediction label for the leaf by:
    performing, soft voting of class labels in the particular leaf.

18. The apparatus as in claim 16, wherein the apparatus uses the histogram to determine the final prediction label for the leaf by:

identifying the final prediction label as a predicted class having the highest object count.

19. A tangible, non-transitory, computer-readable medium storing program instructions that cause a device to execute a process comprising:
- training, by the device, a machine learning-based malware classifier using a first randomly selected subset of samples from a training dataset, wherein the classifier comprises a random decision forest;
- identifying, by the device and using at least a portion of the training dataset as input to the malware classifier, a set of misclassified samples from the training dataset that the malware classifier misclassifies;
- retraining, by the device, the malware classifier using a second randomly selected subset of samples from the training dataset combined with the entire set of the identified set of misclassified samples;
- adjusting, by the device, prediction labels of individual leaves of the random decision forest of the retrained malware classifier based in part on decision changes in the forest that result from assessing the entire training dataset with the classifier; and
- sending, by the device, the malware classifier with the adjusted prediction labels for deployment into a network.

20. The computer-readable medium as in claim 19, wherein the process when executed further comprises:
- pruning, by the device and after adjusting the prediction labels of the individual leaves of the random decision forest, leaves from the random decision forest.

* * * * *

UNITED STATES PATENT AND TRADEMARK OFFICE
CERTIFICATE OF CORRECTION

PATENT NO. : 10,885,469 B2
APPLICATION NO. : 15/722412
DATED : January 5, 2021
INVENTOR(S) : Jan Brabec It is certified that error appears in the above-identified patent and that said Letters Patent is hereby corrected as shown below:

In the Specification

Column 8, Line 35, please amend as shown:
$argmax_{y \in Y} \sum_{i=1}^{N} I(\, t_i(\mathbf{x}) = y))$ (Equation 1)

Column 11, Line 37, please amend as shown:
the histogram of objects from D which end up in this leaf.

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*